United States Patent
Dabecki et al.

(10) Patent No.: US 6,496,516 B1
(45) Date of Patent: Dec. 17, 2002

(54) RING INTERFACE AND RING NETWORK BUS FLOW CONTROL SYSTEM

(75) Inventors: Stephen Dabecki, Maple Ridge (CA); Sivakumar Radhakrishnan, Hillsboro, OR (US)

(73) Assignee: PMC-Sierra, Ltd. (CA)

( * ) Notice: Subject to any disclaimer, the term of this patent is extended or adjusted under 35 U.S.C. 154(b) by 0 days.

(21) Appl. No.: 09/206,697

(22) Filed: Dec. 7, 1998

(51) Int. Cl.[7] ............................................... H04L 12/43
(52) U.S. Cl. ........................ 370/460; 370/406; 370/413; 370/415; 370/417
(58) Field of Search .......................... 370/460, 395.71, 370/401, 406, 412, 413, 415, 417, 419, 420, 424, 428, 447, 452, 459, 461, 462, 497

(56) References Cited

U.S. PATENT DOCUMENTS

| | | | |
|---|---|---|---|
| 5,490,145 A | | 2/1996 | Tanabe et al. ............... 370/452 |
| 5,758,075 A | * | 5/1998 | Graziano et al. ........... 709/250 |
| 5,896,384 A | * | 4/1999 | Erickson ..................... 370/452 |
| 6,052,373 A | * | 4/2000 | Lau ............................. 370/399 |

OTHER PUBLICATIONS

S.L. Scott et.al, "Performance of the SCI Ring" Communications of ACM, 1992, pp. 403–414.

* cited by examiner

Primary Examiner—Douglas Olms
Assistant Examiner—Phirin Sam
(74) Attorney, Agent, or Firm—Hall, Priddy, Myers & Vande Sande

(57) ABSTRACT

A ring interface is coupled to a current node in a ring network having a plurality of nodes and corresponding ring interface for each of said nodes. The ring interface includes a ring input port operative to conduct upstream message packets from a previous node to the ring interface, a ring output port operative to conduct message packets to a next node of the ring network, and a bypass queue operative to buffer message packets. A receive queue buffers message packets before passing them on to the current node. An address filter is coupled to the ring input port to receive the upstream message packets, read their destination addresses and pass them to the bypass queue if the addresses correspond to another node and pass them to the receive queue if their addresses are that of the current node. A transmit queue buffers message packets from the current node and a bypass-transmit queue arbiter is coupled to outputs of the bypass queue and the transmit queue and is operative to select message packets from one of the bypass queue and the transmit queue in accordance with predetermined selection criterion and transmits the selected message packets to the ring output port.

16 Claims, 11 Drawing Sheets

Procedure Ring_ingress_address_filter()

Input : Exact packet, current_node_address
(1) Repeat
(2)  if (current_node_address == destination_address) then         /* Packet has reached */
(3)         Decrement hop count in the current packet       /* the destination */
(4)         send packet to RQ
(5)  elseif (current_node_address == source_address) || (hop_cnt == 0) then        */
(6)         Discard packet       /* Pkt has come back to source or Hop count is violated */
(7)  else                                   /* Throw away */
(8)         Decrement hop count in the current packet
(9)         send packet to Bypass Queue        /* packet is on flight to a different destination */
(10) end
(11) End Repeat

FIG. 3

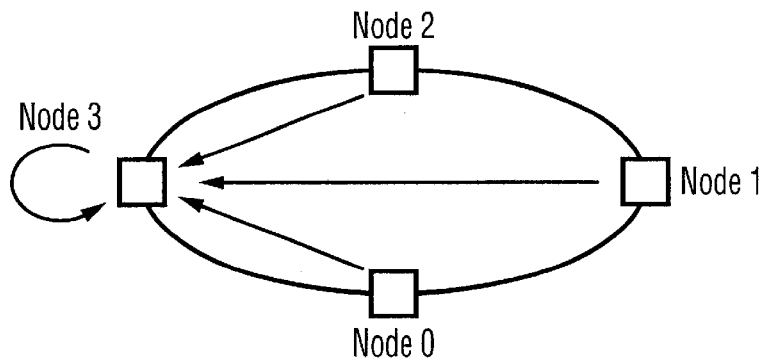

```
Procedure Bypass_transmit_queue_arbitrator()
Input: flow_control_flag, stop_trq,b
(1) Repeat
(2)    If (flow_control_flag == 0) then              /* Check to see the current flow_control state */
                                                     /* flow_control_flag = 0 indicates no flow control */
(3)       if (BPQ empty) && (TRQ empty) then         /* Here both queues are empty */
(4)          send Not Busy idle                      /* Transmit NBI symbol since no data*/
(5)       Elsif (BPQ NOT empty) && (TRQ empty) then  /* BPQ has data */
(6)          send BPQ packet with Not Busy Delim     /* Encode NBD in data packet of BPQ */
(7)       Elsif (BPQ empty) && (TRQ NOT empty) then  /* TRQ has data */
(8)          send TRQ packet with Not Busy Delim     /* Encode NBD in data packet of TRQ */
(9)       Elsif (BPQ NOT empty) && (TRQ NOT empty) then  /* BPQ and TRQ have data */
(10)         if (idle_flag == 0) then
(11)            send Not Busy idle  /* This will ensure that the not busy symbol
                                       flows downstream */
(12)            idle_flag = 1;  /* Lock idle flag so that bandwidth is not wasted
                                   for subsequent data */
(13)         Endif
(14)         send BPQ packet with Busy Delim  /* Indicate flow control ON state downstream *
                                              /* by encoding NBD in data packet of BPQ and send it */
(15)                                          /*Bypass Queue has higher Priority */
(16)    Else      /* flow control > 0 implies transmission from
                     /* current node should be inhibited*/
(17)       If (BPQ empty) && (TRQ empty) then   /* Both queues are empty */
(18)          send Busy idle symbol             /*Transmit BI since no data */
(19)       Elsif (BPQ NOT empty) && (TRQ empty) then  /* BPQ has data */
(20)          send BPQ packet with Busy Delim.   /* Encode BD in data packet of BPQ */
(21)       Elsif (BPQ empty) && (TRQ NOT empty) then  /* TRQ has data */
(22)          if (stop_trq == 0) /* TRQ can transmit only if stop is deasserted */
```

(23) send "b" packets with Busy Delim from TRQ
     /* Burst through b successive TRQ packets */
(24) stop_trq = 1     /* Disable TRQ from sending any more packets until
(25)                      congestion clears     */
(26) Send Not busy Idle Symbol /* Transmit an NBD to enable restarting of
(27)                                 /* downstream devices */
(28) else
(29)   send busy Idle /* Transmit BI to request permission for retransmission */
(30) endif
(31) Elsif (BPQ NOT empty) && (TRQ NOT empty) then  /* BPQ and TRQ have data */
(32)   idle_flag = 0;     /* Reset idle flag to send Not busy symbol later */
                          /* in flow control_off state */
(33)   send BPQ packet with Busy Delim.  /* Indicate flow control downstream by */
(34)                                     /* encoding BD in data packet of BPQ */

(35)                /* and send it since Bypass Queue has higher Priority */
(36) Endif
(37) Endif
(38) End Repeat

FIG. 6b

Procedure flow_control_state_manipulator()

(1) Repeat
(2)     delimiter_servicer()    /* Execute both procedures in parallel threads */
(3)     not_busy_state_servicer()
(4) End Repeat

FIG. 7

Procedure delimiter_servicer()

input : stop_trq,flag
(1) If (received symbol in the Ring ingress equals BD or BI ) then
(2)     f = 1;    /* Detect Busy State*/
(3) Elsif received symbol in the Ring ingress equals NBD or NBI then
(4)     f = 0;    /* Detect Not busy State*/
(5)     If (stop_trq) then
(6)         stop_trq = 0;    /* Condition for restarting the Transmit queue */
(7)                             /* Reset stop_trq flag to enable transmit queue to send data */
(8)     endif
(9) endif
(10) flag = flag OR f   /* Perform an OR operation on the current state and received busy/Not busy states */

FIG. 8

Procedure not_busy_state_servicer()

Input : flag
(1) If (received symbol in the Ring ingress equals NBD or NBI ) then
(2)    flow_control_flag = 0          /* Reset flow_control_flag to indicate flow control is OFF*/
(3)    flag = 0   /* Reset congestion_flag to remove congested state indication*/
(4)    Wait for at least one of the 4 conditions (Lines 3, 5, 7, 9) in the flow_control_flag = 0 state
(5)         of Fig. 6 to be completed in entirety
                                       /* i.e, send at least one data; if no data then send a Not busy symbol */
(6) endif
(7) flow_control_flag = flag          /* Update flow_control_flag */

FIG. 9

| # of packets(time slots) | 1 | 2 | 3 | 4 | 5 | 6 | 7 | 8 | 9 | 10 | ... |
|---|---|---|---|---|---|---|---|---|---|---|---|
| Bypass Queue Size | 1 | 1 | 2 | 2 | 3 | 3 | 4 | 4 | 5 | 5 | ... |
| Transmitted Packets |   | B | T | B | T | B | T | B | T | B | ... |

Start →

50%-50% Bandwidth Split (BPQ-TRQ)
(Repetition Frequency of TRQ k = 2)

FIG. 11a

| # of packets(time slots) | 1 | 2 | 3 | 4 | 5 | 6 | 7 | 8 | 9 | 10 | ... |
|---|---|---|---|---|---|---|---|---|---|---|---|
| Bypass Queue Size | 1 | 1 | 1 | 2 | 2 | 2 | 3 | 3 | 3 | 4 | ... |
| Transmitted Packets |   | B | B | T | B | B | T | B | B | T | ... |

Start →

66.67%-33.33% Bandwidth Split (BPQ-TRQ)
(Repetition Frequency of TRQ k = 3)

FIG. 11b

| # of packets(time slots) | 1 | 2 | 3 | 4 | 5 | 6 | 7 | 8 | 9 | 10 | ... |
|---|---|---|---|---|---|---|---|---|---|---|---|
| Bypass Queue Size | 1 | 1 | 1 | 1 | 2 | 2 | 2 | 2 | 3 | 3 | ... |
| Transmitted Packets |   | B | B | B | T | B | B | B | T | B | ... |

Start →

75%-25% Bandwidth Split (BPQ-TRQ)
(Repetition Frequency of TRQ k = 4)

FIG. 11c

```
Procedure adaptive_priority_servicer()
Input : priority_servicer_en

Global: count, TRQ_priority threshold (1) Repeat
(2)     If (priority_servicer_en == 0) then          /* Check to see if priority servicer is enabled */ /
(4)         send BPQ packet with Busy delimiter      /* Send BPQ packet with busy to stop next node*/
                                                     /* Reset counter */
(9)     Else                                         /* Priority Servicer is enabled*/
(3)         If (TRQ_priority_threshold == count) then    /* See if count has reached threshold */
(4)             send TRQ packet with NBD /* Send TRQ with NBD */
(5)             count = 0
(12)        Else                                     /* BPQ transmit opportunity. */
(13)            send BPQ packet with NBD /* if BPQ packet, then send it */
(14)            count = count + 1                    /* and increment counter */
(20)        Endif
(20)    Endif
(21) End Repeat
```

FIG. 12

Procedure adaptive_priority_servicer_controller()

Global: low_water_mark, high_water_mark (1) Repeat for each change in BPQ size
(2)    Calculate the index range of Bypass Queue as a function of its current size, max. range (R), high_water_mark and depth.
      i.e. i = (current_size / (d_BPQ - high_water_mark))*R
(3)    if (i >= high_water_mark of Bypass Queue) then   /* BPQ is full and indicates potential */
(4)       adaptive_priority_servicer(0);   /* Disable adaptive priority servicer since */
                                          /* congestion : 100 % priority to BPQ */
(5)    else   /* Bypass Q can still handle traffic growth */
                                            /* Less or no congestion */
(6)       Compute the programmable weight k   /* Use the linear or non-linear scheme */
(7)       Set count = k - 1   /* Set the global counter register */
(8)       adaptive_priority_servicer(1);   /* Re-enable adaptive priority servicer method */
(9)    Endif
(10)  if (i <= (low_water_mark/ d_BPQ) * R) and (adaptive_priority_servicer is disabled) then
(11)      adaptive_priority_servicer(1);   /* Enable adaptive priority servicer again */
(12)  Endif
(13)
(14)
(15) End Repeat

FIG. 13

RING INTERFACE AND RING NETWORK BUS FLOW CONTROL SYSTEM

FIELD

The present invention relates to a ring interface and network flow control system for passing message packets between source and destination pairs in the ring.

BACKGROUND

Modern computer communications networks, particularly ethernet systems, employ multiple access communications methods to share their communications resources. A multiple-access communications channel is a network system whose communications media are shared among distributed stations (terminals, computers). Different classes of computer communications networks, include wired and wireless local and metropolitan area networks, satellite communications networks, and local area optical communications networks. The various topologies for shared-medium communications networks include star, bus, ring, mesh and broadcast radio, crossbar, trees, hypercubes and hypercycles. These network topologies have been proposed in the past for designing parallel computers and computer communication networks. A given topology or structure has nodes connected by point-to-point links which form a static interconnection network. One such structure is the ring structure shown in FIG. 1. In this structure stations or nodes 11 are connected by point-to-point links in, typically, a closed-loop bus 13. In the physical ring implementation, each station 11 connects to the ring through an active ring interface 15 so that transmissions across the ring pass through and are delayed in the register of the ring interface units 15 they traverse. The architectural features of an interconnection network play a major role in its performance. Some of these desirable features include a small number of ports incident on each node, i.e., a low degree, a smaller average distance for lower network latency, fault-tolerance, scalability and reduced cost of implementation.

A scalable coherent interface (SCI) uses a ring based topology with point-to-point unidirectional links that use a packet based communication protocol for sharing message packets between source-destination nodes. The SCI uses a flow control method to prevent node starvation and reduce the ability of the nodes to unfairly consume ring bandwidth. However, the implementation of this algorithm is not very robust and the method suffers from low utilization.

Accordingly, it is an object of the invention to provide an improved interface architecture with accompanying packet based communication protocol that permits transmission of data from each node of a network under all network conditions.

SUMMARY OF THE INVENTION

According to the invention there is provided a ring interface coupled to a current node in a ring network having a plurality of nodes and corresponding ring interface for each of said nodes. The ring interface includes a ring input port operative to conduct upstream message packets from a previous node to the ring interface, a ring output port operative to conduct message packets to a next node of the ring network, and a bypass queue operative to buffer message packets. A receive queue buffers message packets before passing them on to the current node. An address filter is coupled to the ring input port to receive the upstream message packets, read their destination addresses and pass them to the bypass queue if the addresses correspond to another node and pass them to the receive queue if their addresses are that of the current node. A transmit queue buffers message packets from the current node and a bypass-transmit queue arbiter is coupled to outputs of the bypass queue and the transmit queue and is operative to select message packets from one of the bypass queue and the transmit queue in accordance with predetermined selection criterion and transmits the selected message packets to the ring output port.

The output arbiter may give the bypass queue a 100% priority over the transmit queue for selecting and passing message packets on to the ring output port.

The transmit queue may back-pressure the current node to stop injecting new message packets if the transmit queue is full.

The address filter may discard a message packet if an address of a source address of the message packet is the current node.

In another aspect of the invention there is provided a ring network having a ring bus interconnecting a plurality of nodes including a ring interface positioned between each node and the ring bus. The ring interface includes coupled to a current node in a ring network having a plurality of nodes and corresponding ring interface for each of said nodes. The ring interface includes a ring input port operative to conduct upstream message packets from a previous node to the ring interface, a ring output port operative to conduct message packets to a next node of the ring network, and a bypass queue operative to buffer message packets. A receive queue buffers message packets before passing them on to the current node. An address filter is coupled to the ring input port to receive the upstream message packets, read their destination addresses and pass them to the bypass queue if the addresses correspond to another node and pass them to the receive queue if their addresses are that of the current node. A transmit queue buffers message packets from the current node and a bypass-transmit queue arbiter is coupled to outputs of the bypass queue and the transmit queue and is operative to select message packets from one of the bypass queue and the transmit queue in accordance with predetermined selection criterion and transmits the selected message packets to the ring output port.

The ring interface may include a Flow_Control_State_Manipulator coupled to the ring input, the Flow_Control_State_Manipulator being operative to determine a current flow control state of the ring network and to communicate to the bypass-transmit queue arbiter a status of the current flow control state of the ring network.

The message packets may preferably be encoded using 8B/10B code for encoding data and control characters. The data and control characters may be in the form of binary-coded symbols with a delimiter signal being used to distinguish between the data and control characters. The delimiter signal may be a BUSY or IDLE control character which precedes and terminates every message. An odd number of characters may be inserted between every pair of the BUSY or IDLE characters.

A FILL character may be appended to a message before a terminating BUSY or IDLE character in the event there are an even number of characters in the message. An IDLE state on said ring network may be indicated by a repeated sequence of IDLE or BUSY and FILL characters. The FILL characters may include a FILLN character and a FILLP character, the FILLN character being inserted when a running disparity computed over all of characters that have been transmitted previously on a given link joining two nodes at an end of a previous transmission is negative and the FILLP character being inserted when a running disparity computed over all of characters that have been transmitted previously on a given link joining two nodes at an end of a previous transmission is positive. The term "disparity" refers to the number of "1's" and "0's" in the stream of data.

BRIEF DESCRIPTION OF THE DRAWINGS

Further features and advantages will be apparent from the following detailed description, given by way of example, of a preferred embodiment taken in conjunction with the accompanying drawings, wherein:

FIG. 3 is the computer code for the ring egress decoder/ address filter;

FIG. 4 is a schematic diagram of a 4-node network in which all nodes send packets to a fixed destination;

FIG. 6 is the pseudo-code representing the bypass transmit queue arbitrator;

FIG. 7 is the pseudo-code of the flow control state manipulator;

FIG. 8 is the pseudo-code of the delimiter servicer;

FIG. 9 is the pseudo-code of the "NOT BUSY" state servicer;

FIGS. 11a, 11b and 11c are bandwidth distribution patterns for various values of the bypass queue to transmit queue bandwidth ratios;

FIG. 12 is the pseudo-code representing the adaptive priority servicer algorithm; and FIG. 13 is the pseudo-code representing the adaptive priority servicer controller algorithm.

DETAILED DESCRIPTION WITH REFERENCE TO THE DRAWINGS

Figure 1:
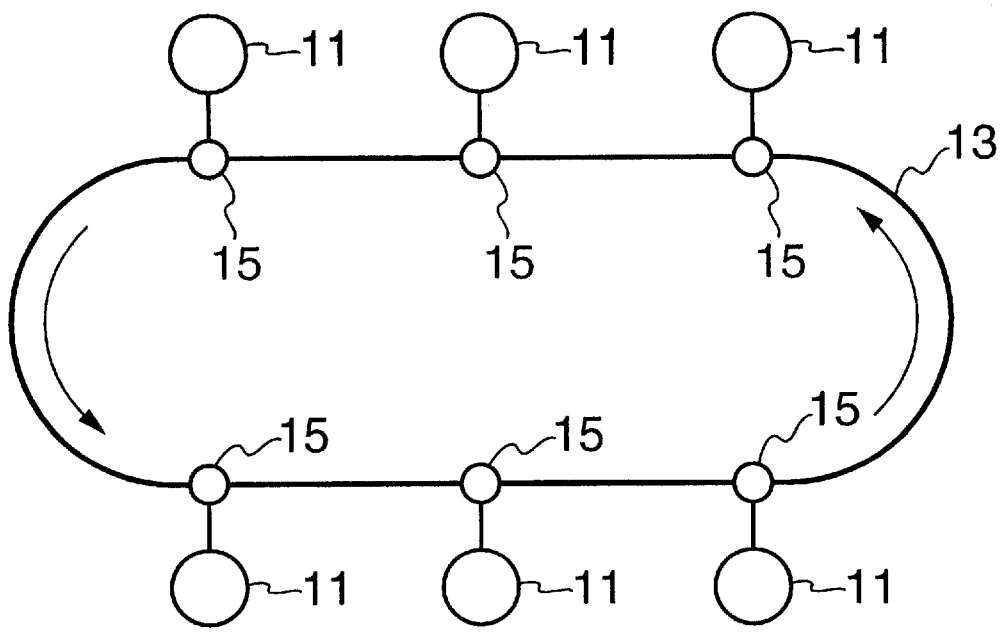
FIG. 1 is a schematic diagram of a ring network topology.
Figure 2:
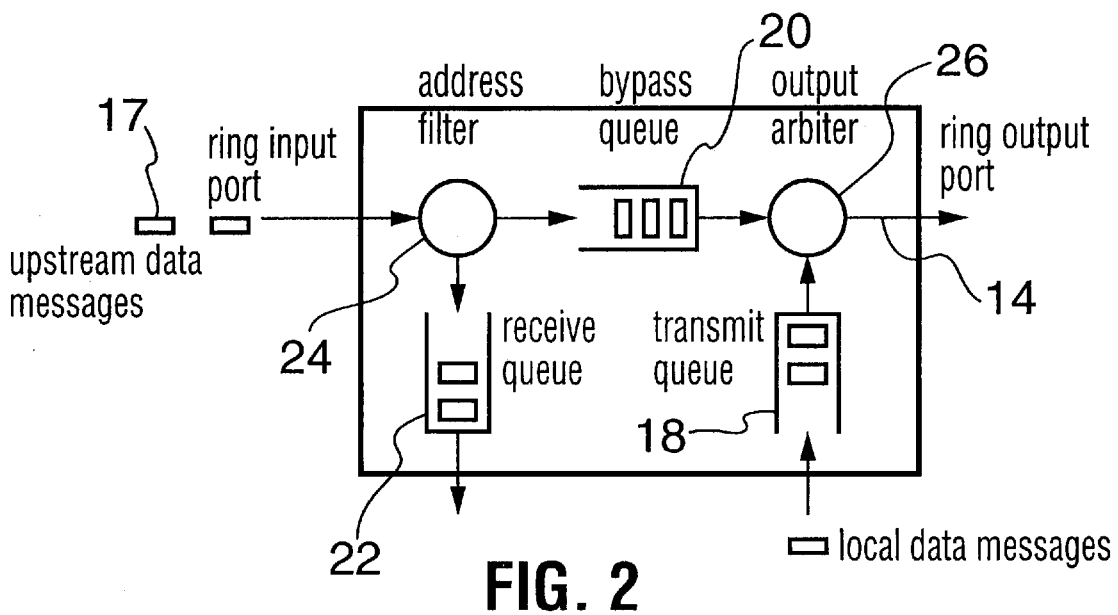
FIG. 2 is a schematic diagram of the architecture of a ring interface in accordance with the present invention.

Referring to FIG. 2, a ring interface 10 (termed the "EXACT Interface") is applicable to transmit Ethernet frames 17 from a source to a destination through a switch fabric with a given number of ports that can support data rates of 10/100/1000 Megabits per second. The ring interface 10 has two independent input/output ports 12 and 14 which import packets at the ring ingress (input) 12 and export packets at the ring egress (output) 14. Packets are intercepted at the ring ingress 12 and passed either to a next node or the current node based on the destination addresses present in each packet. The ring interface 10 is incorporated into a bus 13 (called the "EXACT Bus") that is a point-to-point link connecting each node 11 to its neighbour in the form of a ring (see FIG. 1). The EXACT Bus 13 is implemented using an 8B10B coding method at the physical layer for data control and special codes. The EXACT Bus 13 may also be used in a clear-channel or binary coded data transfer mode (see below) where 8B10B coding is not used.

The ring interface 10 has a transmit queue 18 which accumulates packets (called "EXACT Packets") 17 from an external logical block (not shown) and routes them to the ring output 14 after passing through a bypass-transmit queue arbitrator 26. The transmit queue 18 back-pressures an external block in the current node 11 to stop injecting new packets should the queue become full.

A bypass queue 20 accumulates passing EXACT packets. The bypass-transmit queue arbitrator 26 selects EXACT packets from the bypass or transmit queues 20 or 18, respectively, based upon a given selection method and transmits through the ring egress 14 to the next node 11 in the ring. The simplest selection method is to provide 100% priority to the bypass queue if there is at least one packet 17 waiting in the bypass queue 20. The transmit queue 18 will only get an opportunity if the bypass queue 20 is empty.

The ring ingress port 12 transfers EXACT packets from the previous node 11 to the current node 11. Immediately upon arrival, the EXACT packet 17 is analyzed to determine if it has reached its destination or if the packet 17 needs to be discarded. Cut-through routing (i.e. forwarding the packet 17 in a pipelined fashion as soon as enough routing information is extracted) is performed by the EXACT interface block 10 at the ring ingress 12 wherever possible.

The operation of the ring ingress decoder or address filter 24 is based on the fields of the EXACT packets 17. If the destination address in the packet being analyzed is the current node 11 then the packet is passed to the receive queue 22. If the source address is that of the current node 11 then an error condition exists and the packet is discarded. Otherwise, the packet is sent to the bypass queue 20 if it is destined for a different node. The algorithm for the ring ingress decoder is formally summarized in FIG. 3.

The above arbitration method works well for randomly distributed destination addresses in the EXACT packets and simulation results have shown a bandwidth utilization of 93%. However, it is obvious that the 100% priority ascribed to the bypass queue 20 will block the transmit queue 18 from sending any packets under certain conditions resulting in unfair bandwidth distribution. Flow control schemes would then be necessary to alleviate the starvation but at the cost of bandwidth utilization.

A typical example is shown in FIG. 4, where all nodes transmit packets to a single node i.e., destination node 3. In this case, they will be prevented from transmitting their packets since their bypass queues (BPQ) 20 are continuously filled by the packets from node 3. Given the 100% BPQ priority algorithm, as load starts to increase, the downstream nodes (e.g. nodes 0, 1 and 2) will be prevented from transmitting data if there is a continuous burst of traffic (say from node 3) occupying their bypass queues 20. Consequently the fairness for the downstream nodes will suffer drastically.

Physical Layer Coding Overview

Two distinct types of coding are used on the EXACT ring, depending on the operating mode of the various nodes on the ring. The normal coding method, which is mandatory for all devices conforming to the EXACT specification, employs the 8B/10B line code for encoding data and control characters. An alternate coding method is also permitted as an optional mode: in this coding, data and control characters are transferred as binary-coded symbols, with a special delimiter signal being also supplied to distinguish between the two.

In normal operation, each EXACT bus 13 carries a constant stream of symbols. When no data or control characters are being transferred, a special set of IDLE characters must be continuously driven on to the bus 13 with the appropriate clock and control signals. These IDLE characters are removed from the ingress data stream by each EXACT device, and re-inserted as required into the egress data stream by every EXACT device.

Data are transferred in the form of message packets 17, which contain a number of data characters delimited by special BUSY or IDLE control characters. Each message must be preceded and terminated by at least one BUSY or IDLE character. The selection between a BUSY and an IDLE character is determined by the flow control mechanism on the EXACT bus, as described later. It is permissible for the same IDLE or BUSY character to both terminate a given message and also precede the next message (i.e., there need be only one IDLE or BUSY character separating any two message packets).

It is mandatory for an odd number of characters to be inserted between every pair of BUSY or IDLE synchronization characters. A set of FILL control characters is provided for this purpose. Therefore, if an EXACT message (consisting of only data characters) is an even number of characters long, a FILL character is appended to the message before the terminating BUSY or IDLE character. This FILL character is stripped out of the incoming data stream by the receiving EXACT device; it is not as part of the message.

The IDLE state on the ring (i.e., when no data are available to be transmitted) is indicated by a repeated sequence of IDLE/BUSY and FILL characters. The minimum number of characters that may be transferred during an IDLE state on the ring is thus 2. It is permissible for an EXACT device to transmit fewer IDLE symbols (i.e., pairs of IDLE/BUSY and FILL characters) on its egress EXACT port as compared to its ingress EXACT port. This can compensate for transient clock phase or frequency differences, subject to the minimum of one IDLE/BUSY character between data message packets.

8B10B Indications and Coding

In the 8B/10B coding mode, data are encoded as conventional 8B/10B data symbols (e.g. D0.0 or D27.1) and control characters (IDLE, BUSY, etc.) use reserved special codes (referred to as the K28.5 comma character definitions). In standard 8B10B terminology "D" stands for "data" and "K" refers to "control".

Each 8B/10B data character carries 8 bits of information. The coding varies for a given data value depending on the running disparity computed over all of the characters that have been transmitted previously on the same link. Two distinct characters are used to represent each data value, depending on whether the running disparity at the end of the transmission of the previous character was positive or negative. Positive disparity means an even number of "1's" and "0's" and negative disparity means an odd number.

Control codes are indicated by the use of special 8B/10B characters; these characters do not correspond to any valid data symbol, and can hence be unambiguously distinguished. There are five special 8B/10B characters used for control signaling: IDLE, BUSY, ERROR, FILLP, and FILLN. BUSY and IDLE are used to indicate the start of a message and the status of the ring. ERROR is used by an EXACT-IS or EXACT-ES device to indicate that an 8B/10B line code error was detected. FILLP and FILLN are used to pad an EXACT data stream to an even number of bytes, and are used for a positive and negative running disparity, respectively.

As mentioned previously, an EXACT data stream must contain an odd number of bytes between IDLE/BUSY synchronization characters for proper operation. Two FILL characters are therefore provided for this purpose. FILLP is used when the current running disparity is positive, and FILLN is used when the running disparity is negative. If a message contains an odd number of DATA bytes, however, no FILL character need be used before the first IDLE/BUSY character.

If a line code error has occurred during transmission, the ingress (EXACT-IS) or Egress (EXACT-ES) device that detects the error should replace the errored character with the special ERROR control character. An EXACT-IS device acts as a transparent fabric or bridge, whose primary function is to forward EXACT messages between different EXACT buses. An EXACT-ES device resides on an EXACT bus and either generates or accepts EXACT messages This ensures that the error notification will be propagated to all devices on the ring.

Clear-Channel Indications and Coding

In clear-channel (i.e., binary coded) data transfer mode, no special coding of data characters is employed. Instead, the most-significant bit of the 10-bit data bus in the EXACT transmit and receive buses carries an even parity bit, the next most significant bit indicates a delimiter signal, and the remaining 8 bits carry the 8-bit data value without any coding. When transferring a data value, bit 8 of the transmit and/or receive data bus must be set to zero.

Control characters are indicated by a logic '1' on bit 8 of the transmit and/or receive data buses. These control characters correspond to the IDLE, BUSY, FILL and ERROR characters required by the message transfer and synchronization protocol. The different control characters are distinguished by the coding of the 8 LSBs of the data bus.

The following table summarizes the coding used in clear-channel mode.

| DATA [9] | DATA [8] | DATA (7:0) | Interpretation |
| --- | --- | --- | --- |
| Even parity | 0 | 00000000 | Binary data value ($00_H$) |
| . | . | . | . |
| . | . | . | . |
| . | . | . | . |
| Even parity | 0 | 11111111 | Binary data value ($FF_H$) |
| Even parity | 1 | 00000001 | IDLE |
| Even parity | 1 | 00000010 | BUSY |
| Even parity | 1 | 00000100 | FILL |
| Even parity | 1 | 00001000 | ERROR |

Ring Flow Control Overview and Use of Control Codes

The flow control mechanism is intended to ensure fair sharing of ring bandwidth, especially when the ring utilization equals or exceeds the ring capacity, while at the same time using a simple, stateless protocol that does not consume significant ring bandwidth.

The EXACT flow control algorithm functions by using special flow control indications inserted into the delimiter symbols that separate message packets transferred over the ring. As all EXACT message packets are of bounded length, flow control indications are guaranteed to be transmitted even under situations of high traffic via this method.

Four sets of symbol pairs are used by the flow control mechanism (from those available in the 8B/10B line code in the 8B/10B operating mode, or from the binary-coded line code in clear-channel operating mode). These symbol pairs are used to signify whether the node 11 is requesting access to the ring in the presence of high traffic (i.e., while the bypass queue or buffer 20 in the node is occupied). The table below summarizes the flow control coding:

| Indication | Symbol Pair | Meaning |
|---|---|---|
| NBI (NOT BUSY, IDLE) | IDLE, IDLE | Node has no data to transmit and is not attempting to flow control an upstream node |
| NBD (NOT BUSY, DATA) | IDLE, DATA | Node is beginning a transmitted message, and is not attempting to flow control an upstream node |
| BI (BUSY, IDLE) | BUSY,BUSY | Node is not currently transmitting, but is attempting to flow control an upstream node |
| BD (BUSY, DATA) | BUSY, DATA | Node is beginning a transmitted message, and is attempting to flow control an upstream node |

In general, a node may send a BI (BUSY, IDLE) or BD (BUSY, DATA) symbol pair, to request other nodes to cease transmitting, if a message at the head of its transmit queue has waited without a transmission opportunity for a time longer than the flow control initiate time T. A node that receives a BI or BD message must cease transmission immediately, and must not transmit again until one or more NBI (NOT BUSY, IDLE) or NBD (NOT BUSY, Delimiter) symbols are received at its input EXACT port. The receipt of an NBI or NBD code at the input to the node is an indication that none of the downstream nodes are requesting access to the ring, and hence that flow control is no longer active.

More detail on the flow control process will be supplied after the line codes for the two operating modes have been described.

8B/10B Line Codes for Flow Control

In 8B/10B encoded mode, EXACT devices are required to use the following encoding to signal the various flow control indications:

| Indication | Code Pair | Data[9:0] Encoding |
|---|---|---|
| NBI+ (NOT BUSY, IDLE, POSITIVE RUNNING DISPARITY) | IDLE, FILLP | K28.5, K29.7 |
| NBI− (NOT BUSY, IDLE, NEGATIVE RUNNING DISPARITY) | IDLE, FILLN | K28.5, K28.6 |
| NBD+ (NOT BUSY, DATA, POSITIVE RUNNING DISPARITY) | IDLE, DATA+ | K28.5, DO.0–D31.7 |
| NBD− (NOT BUSY, DATA, NEGATIVE RUNNING DISPARITY) | IDLE, DATA− | 28.5, DO.0–D31.7 |
| BI+ (BUSY, IDLE, POSITIVE RUNNING DISPARITY) | BUSY, FILLP | K28.1, K29.7 |
| BI− (BUSY, IDLE, NEGATIVE RUNNING DISPARITY) | BUSY, FILLN | K28.1, K28.6 |
| BD+ (BUSY, DATA, POSITIVE RUNNING DISPARITY) | BUSY, DATA+ | K28.1, DO.0–D31.7 |
| BD− (BUSY, DATA, NEGATIVE RUNNING DISPARITY) | BUSY, DATA− | k28.1, DO.0–D31.7 |

Clear-Channel Line Codes for Flow Control

The encoding of the flow control symbol pairs in clear-channel mode are given in the following table:

| Indication | Code Pair | DATA [9:0] Encoding |
|---|---|---|
| NBI (NOT BUSY, IDLE) | IDLE, FILL | $101_h$, $104_h$ |
| NBD (NOT BUSY, DATA) | IDLE, DATA | $101_h$, $000\text{-}OFF_h$ |
| BI (BUSY, IDLE) | BUSY, FILL | $102_h$, $104_h$ |
| BD (BUSY, DATA) | BUSY, DATA | $102_h$, $000\text{-}OFF_h$ |

Flow Control Behavior

The EXACT flow control protocol implemented by each EXACT device makes use of received flow control indications, in conjunction with status signals indicating whether the queues in the EXACT ring interface 10 are empty or not-empty, to generate outgoing streams of data with embedded flow control indications and also to modulate its transmit behavior. The node 11 may operate in two possible states: first, with the bypass queue 20 empty (i.e., with no message packets pending to be forwarded from ingress 12 to egress 14) and second, with the bypass queue 20 occupied by one or more message packets being forwarded across the node 11.

Case 1. Bypass Queue is Not Empty

If the bypass queue 20 is not empty, then the transmit arbiter 26 may be required to transmit either the bypass message packets or any message packets generated locally, depending on the arbitration algorithm implemented and the FILL level of the bypass queue 20. In this case, three possible situations may occur, as summarized in the following table:

| Input Indication | Transmit Queue | Output Indication |
|---|---|---|
| BI or BD | Don't Care | BD |
| NBI or NBD | Empty | NBD |
| NBI or NBD | Not-empty | BD |

Case 2. Bypass Queue is Empty

If the bypass queue is empty, the transmit arbiter can either transmit message packets generated locally from the transmit queue 18 or transmit no message packets, depending on the input flow control indications, the arbitration algorithm implemented and the FILL level of the bypass queue 20. In this case, three possible situations may occur, as summarized in the following table:

| Input Indication | Transmit Queue | Output Indication |
|---|---|---|
| NBI | Empty | NBI |
| NBI | Not-empty | NBD |
| NBD | Empty | NBI (non-bypassed) NBD (bypassed) |
| NBD | Not-empty | NBD (non-bypassed) BD (bypassed) |
| BI | Don't Care | BI |
| BD | Don't Care | BI (non-bypassed) BD (bypassed) |

At system startup time, it is assumed that all of the nodes on an EXACT ring have empty queues (bypass 20, transmit 18 and receive 22). In this case, all nodes will place a NOT-BUSY IDLE indication on their egress lines 14. The NOT-BUSY IDLE indication is maintained until data are available to be placed on the ring.

The intent to the algorithm is to provide fairness based on an approximate round robin format in the ring to enable a node to signal other nodes in the ring to cease transmitting thereby providing each node a fair and equal opportunity.

In the basic flow control scheme, a BUSY delimiter signal is sent downstream when there is data in both bypass queue 20 (BPQ) and Transmit Queue 18 (TRQ). Note that under these conditions, the TRQ is blocked and a message from the BPQ is dispatched with the BUSY symbol. The BUSY delimiter when intercepted by a downstream node on its ring ingress 12, immediately puts that node into a "Flow_Control on" state. The "Flow_Control on" state signifies the fact the TRQ of some arbitrary node in the network has been denied an opportunity to transmit. Therefore, the current node which entered the "Flow_Control on" state stops its transmission after it bursts through a fixed length of "b" packets from its transmit queue 18 (TRQ). After sending "b" packets, the current node is stopped from sending any more data from its transmit queue 18 until it is re-enabled.

The BUSY/NOT BUSY indications received on the ring ingress 12 are continuously recorded and this information is used for re-enabling a stopped node and for clearing the "Flow_Control on" state (i.e., changing flow control on to off) and this will place the current node to its normal operational state.

Figure 5:
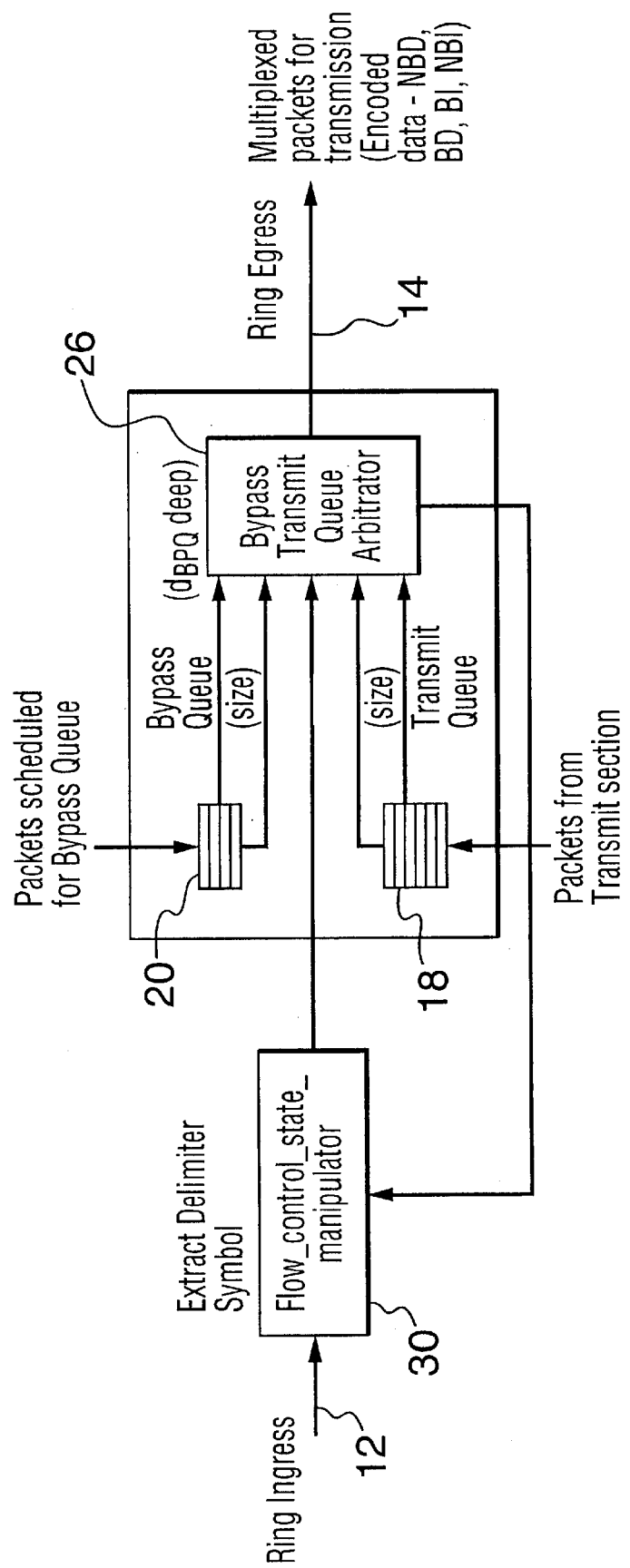
FIG. 5 is a partial block diagram of the bypass transmit queue arbitrator and EXACT interface.

The block diagram of a module that implements flow control is given in FIG. 5. Bypass_Transmit_Queue_Arbitrator 26 performs scheduling of data from the bypass queue 20 (BPQ) and transmit queue 18 (TRQ) based on the flow control state of the node. Flow_Control_State_Manipulator 30 instructs the Bypass_Transmit_Queue_Arbitrator 26 on the current flow control state based on feedback received from the network.

Bypass_Transmit_Queue_Arbitrator

Referring to FIG. 6, the inputs to this procedure include a Flow_Control_Flag indicator that specifies whether or not the current node should enter the flow control state, a stop_trq variable that forces the current node to turn-off and the parameter "b" which denotes the burst length. The procedure arbitrates between the bypass and transmit queues 18 and 20, respectively, sending data from either queue if available but giving 100% priority to the former if there is data present in both streams. The various cases are analyzed in Lines (3) to (11) of FIG. 6 which corresponds to the state when the flow control is not enabled i.e. (Flow_Control_Flag=0 as sensed by the current node). The NOT BUSY state is encoded in the data or IDLE symbols as long as there is data in either queues but not both. When data is present in both BPQ and TRQ as shown in Line (10), the following operations are performed. A NOT BUSY symbol as shown in Line 11 is sent ONLY once each time the Flow_Control_Flag has changed from 1 to 0. (i.e., from ON state to OFF). This function is implemented in the program through the "IDLE_flag" whose initial value is 0. On reaching Line 10, it is locked (asserted) so that subsequent issue to NOT BUSY symbols are prevented. The BPQ data is transmitted downstream due its higher priority with a BUSY delimiter since the TRQ needs to seize the bus later. By encoding the BUSY delimiter on the data, the downstream nodes will control their transmissions.

In the second part to the procedure (starting from Line 12), when the current node 15 in the flow control state (i.e., Flow_Control_Flag=1), BUSY symbols are sent downstream through DATA or IDLE delimiters, as the case may be, depending on the current sizes to the BPQ and TRQs. This is required to relay flow control (on) information downstream and hence constrain them from transmitting.

The most important flow control operation occurs in Lines 17–26 of the algorithm. Note that the variable "stop_trq" is used as a flag to enable or disable the TRQ from sending message packets. If the stop_trq is disabled and when the BPQ is empty and the TRQ has data to send from the current node, the transmit queue 18 bursts through "b" packets continuously with a BUSY delimiter. After completing the burst, the current node sends a NOT-BUSY symbol (for downstream nodes to change flow control states). In addition, the stop_trq flag of the current node is enabled so that it may not transmit any more data from the TRQ.

Flow_Control_State_Manipulator

The purpose to the Flow_Control_State_Manipulator 30 is to co-ordinate the functioning to the Bypass_Transmit_Queue_Arbitrator 26 by detecting and passing the flow control status as appropriate. Two sub procedures are defined in FIG. 7 that work in parallel, viz., 1. Delimiter_Servicer
2. Not_Busy_State_Servicer Variables used: Flag is a signal for storing the flow control state—0 for NOT BUSY and 1 for BUSY. The initial value of the flag variable at the start of simulation is 0 (NOT BUSY). In the Delimiter_Servicer procedure as shown in FIG. 8, the symbols received at the ring ingress 12 are parsed to detect the BUSY and NOT BUSY symbols and an inclusive OR operation is performed to determine the new value of a "flag" variable. Additionally, if a NOT BUSY symbol is received, the stop_trq is disabled in Line 6 so that the node can again burst only when the flow control state is turned on subsequently.

In the Not_Busy_State_Servicer shown in FIG. 9, when a NOT BUSY symbol is received, the current node is reset to the normal state (i.e. Flow_Control_State is OFF) and the flag variable is reset to the NOT BUSY state. Since this procedure works in parallel with the Bypass_Transmit_Queue_Arbitrator 26 and since symbols will be cumulatively received in the ring ingress 12 which will modify the "flag" variable, the Flow_Control_Flag is updated in Line 7 after waiting for a data delimiter or an IDLE symbol that is transmitted when the Flow_Control is OFF in the current node. By this method, it can be ensured that the NOT BUSY symbol will get automatically passed to the next node when any of the first 3 conditions (Lines 3–8) of FIG. 6 is satisfied.

Modified Arbitration Method

To avoid the deficiency to the bypass queue 20 having exclusive control in sending packets downstream, a very flexible "Priority Servicer" arbitration method has been developed that changes the bandwidth allocation (i.e., provides more. opportunities to the transmit queue 18 side) on the fly and is a function of the size of bypass queue 20. A small value of the size of the bypass queue 20 indicates that there are fewer packets coming in to the node and hence the transmit queue 18 can be allowed to send packets if there is one available. On the other hand if the size of the bypass queue 20 builds to a certain threshold, then the Priority Servicing arbitration method for the current node is stopped implying that the bypass queue 20 is now the master and has full control over the transmit queue 18. At the same time, the fact that the size of the bypass queue 20 has reached the danger level is indicative of packets which are traveling from other upstream packets at the maximum rate. The network therefore must be throttled down by a feedback mechanism as discussed earlier. Once the network reverts to its normal state (moderate loading), the adaptive priority servicer is enabled. This modified method would take effect at Lines (14) of FIG. 6 when the BPQ and TRQ have data to send simultaneously. The modified line is inserted at Line 14 of the BPQ-TRQ arbitrator algorithm. In other words Line 14 of FIG. 6 is replaced with the following function call:

$$\text{Adaptive\_Priority\_Servicer\_Controller()} \quad (14)$$

Adaptive Priority Queue Servicer/Controller

Figure 10:
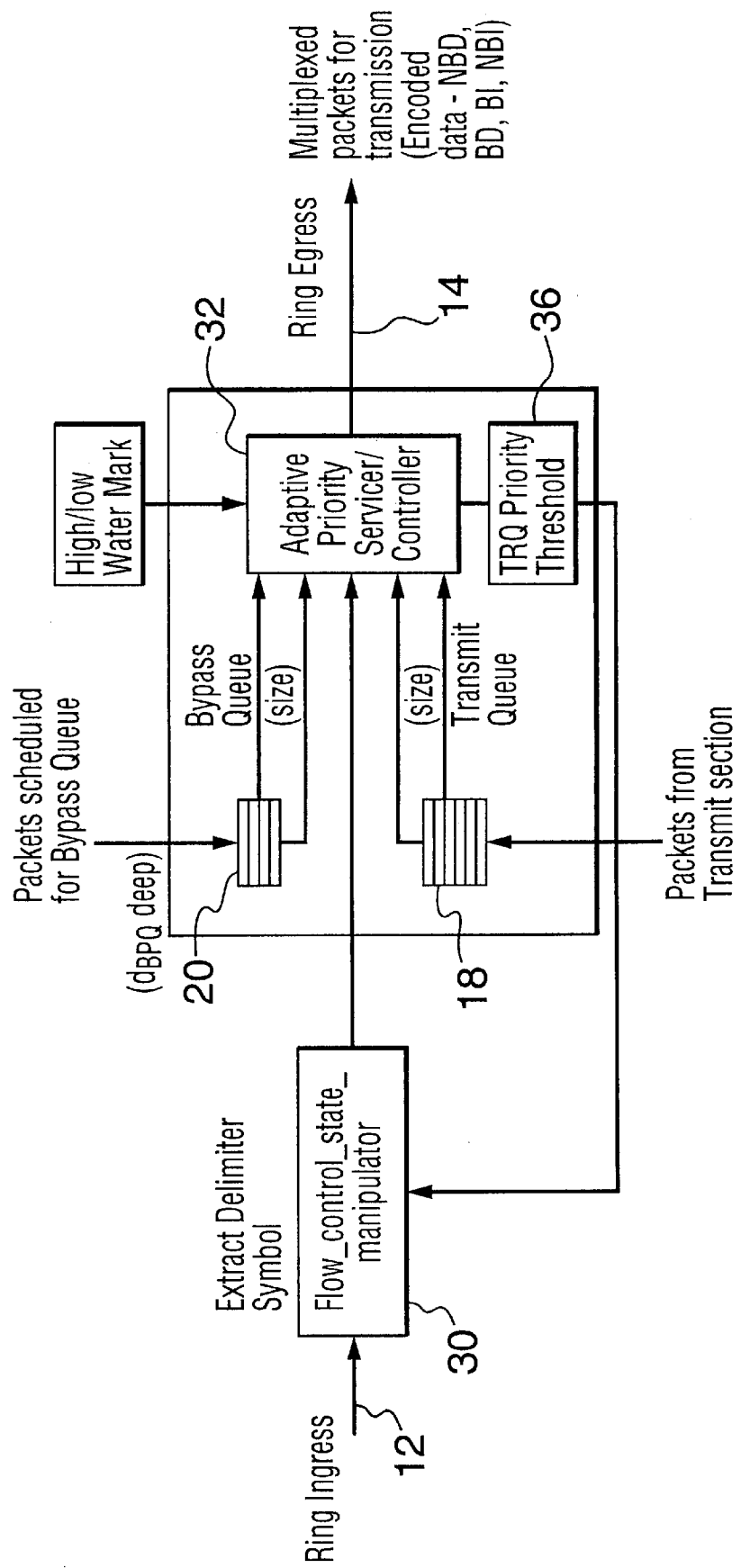
FIG. 10 is a block diagram of the adaptive priority servicer/controller.

Referring to FIG. 10 an Adaptive Priority Queue Servicer/Controller 32 dynamically adjusts the bandwidth allocation between the bypass queue 20 and transmit queue 18 based on the current status of the size of the bypass queue 20 and congestion in the network. If the adaptive priority queue servicer method is not activated, then by default, the bypass queue 20 gets 100% preference over the transmit queue 18. In other words, if there are packets waiting for transmission in both the bypass queue 20 and transmit queue 18, then the bypass queue 18 secures full control in transmitting packets from its queue until it becomes empty. When the bypass queue 20 is empty, then the transmit queue 18 obtains an opportunity to transmit its message assuming there is one available and ready. The transmit queue 18 can be back-pressured to halt further addition of packets into its queue The priority servicer module allocates output bandwidth based on a set of preprogrammed weights. A few illustrative examples of the weights are shown below.

| Bypass Queue Bandwidth | Transmit Queue Bandwidth |
| --- | --- |
| 50% | 50% |
| 66.67% | 33.33% |
| 75% | 25% |
| 80% | 20% |
| 83.33% | 16.67% |

The innovation with this approach is that it is possible to provide opportunities for both BPQ and TRQs. By using a sliding window approach, each queue is guaranteed to be serviced within a predetermined interval. If, however, that queue has no data to send, then the time slot is made available to the other queue. If either of the queues have no data when polled at their service interval, then no data is transmitted.

From the discussion above, it is clear that there is a requirement for the coexistence of both traffic queues to avoid any starvation as well as improve network performance (latency and throughput) and, therefore, the self-conditioning weighted priority mechanism has been devised for local arbitration. It is obvious that for low and moderate loads, the bypass queue 20 will not grow sufficiently large to cause the network to go into a recovery state and yet at the same time, the method will provide more opportunities for the transmit side leading to better efficiency. Under heavy loads, the feedback mechanism using the NOT BUSY delimiters will return the current node from a flow control on state to an off state.

The BPQ/TRQ Adaptive Priority Servicer/Controller 32 arbitrates and sends BPQ and TRQ packets generated from the respective queues to a downstream node using a programmable polling priority mechanism which splits the bandwidth and offers a variable but guaranteed opportunity for the TRQ data queues. Note that if the transmit queue 18 is blocked from sending packets, then it is back-pressured and halted from accepting more data. On the other hand, the bypass queue 20 is not back-pressured and hence may overflow if it is not emptied at a rate greater than the input rate.

By analyzing the growth to the bypass queue 20 and assuming a stream of 264 byte packets (256+8 byte header) @ 1 Gbps back to back this stream implies that if the transmit queue 18 is sending a packet of size 264 bytes, then the bypass queue 20 will accumulate one 264 byte packet during the elapsed transmission time of 2.112 μsec to the next node. If the transmit queue 18 is given an opportunity to transmit when the counter matches the TRQ weightage, then the size of the bypass queue 20 will grow as illustrated in FIG. 11(*a*) for 50%, FIG. 11(*b*) for 33% and FIG. 11(*c*) for 25% opportunities.

The above pattern follows a progression that can be mathematically related to the size of the bypass queue ($S_{BPQ}$), programmed count/weight (k) and the number of packets (p) arriving at the Bypass queue given by $$S_{BPQ} = [p/k] \quad (1)$$

From equation (1), it follows that the growth of the bypass queue 20 is inversely proportional to the programmed weight implying that the larger the value of k, the lesser is the preference given to the transmit queue 18 and hence the bypass queue 20 can accept more packets without overflowing. The following illustrates the numerical interpretation of Eq. (1) for a few sample weights and bypass queue sizes.

| | Priority | | Prog. | Size of | # of |
| --- | --- | --- | --- | --- | --- |
| CASE | BPQ | TRQ | count | Bypass | BP Msgs |
| 1 | 50% | 50% | 2 | 4 | 8 |
| 2 | 66.67% | 33.33% | 3 | 4 | 12 |
| 3 | 75% | 25% | 4 | 4 | 16 |
| 4 | 80% | 20% | 5 | 4 | 20 |
| 5 | 50% | 50% | 2 | 8 | 16 |
| 6 | 66.67% | 33.33% | 3 | 8 | 24 |
| 7 | 75% | 25% | 4 | 8 | 32 |
| 8 | 80% | 20% | 5 | 8 | 40 |

Adaptive Bandwidth Conditioning

As mentioned previously, the size of the bypass queue 20 grows inversely to the value of the programmed weight of the transmit queue 18. We now introduce two schemes that can adaptively increase (decrease) the programmed weight from an initial value as the bypass queue 20 grows (shrinks). Through this method, the priority for the transmit queue 18 is the highest when the size of the bypass queue 20 is least, and vice versa. When the bypass queue 20 reaches a threshold perhaps due to a long burst, the prioritization method is terminated and feedback symbols around the ring as explained earlier regulate the injection rate at the transmit queue 18.

Linear Adaptive Scheme

In this method, the size of the bypass queue 20 is quantized into R discrete sets and the range is chosen such that there is enough room in the BPQ using a level indicator called the High_Water_Mark which is some fraction to the total BPQ capacity. With a given starting value of the weight, say k, for the transmit queue 18, as the network dynamically updates its bypass 20 and transmit 18 queues, the weight is increased/decreased as follows:

Set weight=k+i, if the current size of the bypass queue 20 falls in the $i^{th}$ range where $0<=i<=R-1$. For example if R=4 and High_Water_Mark=50% to BPQ size, then the 4 ranges are [0%–12.5%), [12.5%–25%), [25%–37.5%), [37.5%–50%), the notation denoting the closed and open intervals. If k=5 corresponding to 80%–20% (BPQ-TRQ) priority, then the possible service priorities are indicated in the table below showing the dynamic bandwidth partitioning to bypass and transmit queues using the linear adaptive scheme.

| Range i (R = 4) | Bypass Queue Bandwidth | Transmit Queue Bandwidth |
|---|---|---|
| 0 | 80% | 20% |
| 1 | 83.33% | 16.67% |
| 2 | 85.71% | 14.29% |
| 3 | 87.75% | 12.5% |
| 4> | 100% | 0% |

If the bypass queue's size is such that R>=4 (for this example), then the dynamic arbitration is stopped, flow control is signaled by transmitting BUSY delimiters and 100% priority is allocated to the bypass queue 20 till the traffic load subsides. When the bypass queue 20 starts to diminish and reach a Low_Water_Mark, which is some fraction of the BPQ capacity), then the adaptive arbitration method can be restarted.

Non-linear Adaptive Scheme

This method is similar to the linear method except that the weight of the counter is increased/decreased in a non-linear fashion. The advantage of this method is that for high traffic when the bypass queue grows fast, the priority for the BPQ grows non-linearly providing fewer opportunities for the transmit queue to seize the opportunity. This will alleviate or reduce the transmission of feedback symbols into the network better than the linear adaptive case. If the traffic or burstiness subsides quickly before the threshold level is reached when the adaptive method is turned off, then efficiency and fairness will be enhanced. For ease of hardware implementation, it is proposed that the reduction/increase be a function as a power of 2 as well as the size to the buffers. For example, an implementation to the nonlinear method can use the binary exponential increase/decrease method to calculate the weight.

Set weight=$(k-1)+2^i$, if current size to bypass queue 20 falls in the $i^{th}$ range where $0<=i<=N-1$. Taking the previous example for N=4 and starting weight as k=5, the possible service priority for the TRQ is given in the table below which shows the dynamic bandwidth partitioning for a non-linear adaptive scheme.

| Range (1 <= i <= n) | Bypass Queue Bandwidth | Transmit Queue Bandwidth |
|---|---|---|
| 0 | 80% | 20% |
| 1 | 83.33% | 16.67% |
| 2 | 87.75% | 12.5% |
| 3 | 91.66% | 12.5% |
| 4> | 100% | 0% |

FIG. 12 illustrates pseudo-code that represents the Adaptive Priority Servicer/Controller algorithm implemented in a state machine. The algorithm is divided into 2 parts:
1. Adaptive priority servicer controller.
2. Adaptive priority servicer.

Whether the adaptive priority servicer is enabled or not is determined by the adaptive priority servicer controller 32 that checks the bypass queue 20 for its current size, depth and the given quantization range. The adaptive priority servicer is disabled if the depth to the bypass queue 20 reaches a certain threshold given by the High_Water_Mark. If the priority is disabled, then the bypass queue 20 is given 100% attention. In this case, a packet from the bypass queue 20 is sent if there is one available. If not the transmit queue 18 is serviced and the counter is reset. The adaptive priority servicer is re-enabled only if the depth of the bypass queue 20 falls to a low water mark and the priority servicer was disabled prior. This will provide elasticity in the feedback loop to the algorithm.

On the other hand, if the priority method is enabled, then the polling check is initiated. The polling rate is determined by the TRQ_Priority threshold which is set to an initial value in a general control register. This value determines the rate at which the TRQ will be polled with respect to the BPQ. If the counter reaches the value defined by the TRQ_Priority threshold, then the TRQ is examined for availability of a packet to be transmitted. In this case, if there is a TRQ packet to be transmitted, it is removed from the TRQ and dispatched resetting the counter. Thus, for every one out of TRQ_Priority threshold count, an opportunity for the TRQ is given. If there is no TRQ packet, then its opportunity is lost, the counter is reset and the opportunity is made available to the BPQ queue.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A communications network controller, for use as a node of a packet-based unidirectional ring network having a plurality of. nodes, comprising:
   (a) a ring input port operative to conduct received message packets and control characters from a previous upstream node to said controller;
   (b) a ring output port operative to conduct transmitted message packets and control characters to a next downstream node of said controller;
   (c) a bypass queue operative to buffer message packets being passed from said ring input port to said ring output port;
   (d) a receive queue operative to buffer message packets being passed from said ring input port to said controller;
   (e) an address filter coupled to said ring input port, said receive queue and said bypass queue, and operative to read the destination addresses of message packets received from said ring input port and passing said message packets to said bypass queue if said message packets are not destined for said controller and passing said message packets to said receive queue if said message packets are destined for said controller;
   (f) a transmit queue operative to buffer message packets to be sent to said ring output port by said controller;
   (g) a queue arbiter coupled to said bypass queue, said ring output port and said transmit queue and operative to select message packets from one of said bypass queue and said transmit queue for transfer to said ring output port in accordance with predetermined selection criterion;
   (h) DATA characters that are transmitted on said ring output port, operative to carry message data to be sent, and received from said ring input port, operative to carry message data to be received;

(i) IDLE and BUSY control characters that transmitted on said ring outputs port and received from said ring input port, operative to indicate flow control status of said ring network; and (j) a flow state manipulator coupled to said queue arbiter and operative to process said IDLE and BUSY control characters received from said ring input port, determine said flow control status of said ring network, communicate said flow control status to said queue arbiter and generate said IDLE and BUSY control characters to be transmitted on said ring output port, wherein said flow state manipulator:

causes (NOT BUSY,IDLE), (NOT BUSY,DATA), (BUSY,IDLE) and (BUSY,DATA) symbol pairs corresponding to (node has no data to transmit and is not attempting to flow control an upstream node), (node is beginning a transmitted message and is not attempting to flow control an upstream node), (node is not currently transmitting but is attempting to flow control an upstream node) and (node is beginning a transmitted message and is attempting to flow control an upstream node), respectively, and interprets (NOT BUSY,IDLE), (NOT BUSY,DATA), (BUSY,IDLE) and (BUSY,DATA) symbol pairs as (node has no data to transmit and is not attempting to flow control an upstream node), (node is beginning a transmitted message and is not attempting to flow control an upstream node), (node is not currently transmitting but is attempting to flow control an upstream node) and (node is beginning a transmitted message and is attempting to flow control an upstream node), respectively.

2. A controller according to claim 1, wherein said DATA, BUSY and IDLE characters are encoded using an 8B/10B code.

3. A controller according to claim 1, wherein said DATA, BUSY and IDLE characters are encoded in the form of binary-coded symbols with a delimiter signal being used to distinguish between said DATA, BUSY and IDLE characters.

4. A controller according to claim 3, wherein if said transmit queue is disabled from transmitting but has message packets to transmit, and said bypass queue is empty, said bypass queue bursts through "b" packets with a BUSY delimiter continuously and then sends a NOT BUSY symbol.

5. A controller according to claim 1, wherein a node with a message at a head of its transmission queue that has waited a flow control initiate time T without an opportunity to be transmitted may send a (BUSY,IDLE) or (BUSY,DATA) symbol pair and, in response to receiving a (BUSY,IDLE) or (BUSY,DATA) symbol pair, each of said other nodes in said ring network cease transmission.

6. A controller according to claim 1, wherein in response to said bypass queue being empty, said queue arbiter does one of transmit no message packets and transmit a message packet from said transmit queue in accordance with an arbitration algorithm.

7. A controller according to claim 1, wherein in response to said bypass queue not being empty, said queue arbiter does one of transmit bypass message packets from said bypass message queue and transmit message packets from said transmit queue.

8. A controller according to claim 1, wherein BUSY symbols are sent downstream through with message packets from said bypass queue in response to said controller being in a flow control state to relay flow control on information downstream and prevent downstream nodes from transmitting.

9. A controller according to claim 1, wherein said transmit queue is disabled in response to a NOT BUSY symbol being received at said ring input port.

10. A controller according to claim 1, wherein said controller is reset to a flow control off state in response to said ring input port receiving a NOT BUSY symbol.

11. A controller according to claim 1, wherein said transmit queue is permitted to transmit upon a number of message packets in said bypass queue falling below a predetermined threshold but said transmit queue is disabled upon the number of message packets in said bypass queue reaching a predetermined threshold.

12. A controller according to claim 1, including an adaptive priority queue servicer/controller which dynamically adjusts the bandwidth allocation between said bypass queue and said transit queue based on a number of message packets in said bypass queue and congestion in said ring network.

13. A controller according to claim 12, wherein said priority queue servicer/controller allocates output bandwidth based on a set of pre-programmed weights.

14. A controller according to claim 13, wherein a pre-programmed weight of said transmit queue increases as a number of message packets in said bypass queue decreases and said priority queue servicer/controller is disabled upon a number of message packets in said bypass queue reaching a pre-established threshold.

15. A controller according to claim 13, wherein discrete weights are applied when the number of message packets stored in said bypass queue fall within discrete ranges and then the number of message packets reaches an upper limit and falls below a lower limit said priority queue servicer/controlled is disabled.

16. A controller according to claim 13, wherein the weight is increased and decreased in a non-linear fashion.

* * * * *

UNITED STATES PATENT AND TRADEMARK OFFICE
CERTIFICATE OF CORRECTION

PATENT NO. : 6,496,516 B1
DATED : December 17, 2002
INVENTOR(S) : Dabecki et al.

It is certified that error appears in the above-identified patent and that said Letters Patent is hereby corrected as shown below:

Column 3,
Line 26, delete "FIG. 6 is", and insert -- FIGS. 6A and 6B are --.

Column 6,
Line 40, delete ".    .    . .".

Column 7,
Line 52, delete "28.5", and insert -- K28.5 --.

Column 9,
Line 33, delete "FIG. 6", and insert -- FIGS. 6A and 6B --.
Line 42, delete "FIG. 6 which corresponds", and insert -- FIGS. 6A and 6B which correspond --.

Column 10,
Line 42, delete "FIG. 6 is", and insert -- FIGS. 6A and 6B are --.
Line 48, delete ".".
Line 65, delete "FIG. 6", and insert -- FIGS. 6A and 6B --.

Column 11,
Line 1, delete "FIG. 6 is", and insert -- FIGS. 6A and 6B are --.
Line 3, before "Adaptive", insert -- (14) --.

Column 14,
Line 34, delete ".".

Column 15,
Line 32, after "respectively", insert -- , and interprets (NOT BUSY, IDLE), (NOT BUSY, DATA), (BUSY, IDLE) and (BUSY, DATA) symbol pairs as (node has no data to transmit and is not attempting to flow control an upstream node), (node is not currently transmitting but is attempting to flow control an upstream node) and (node is beginning a transmitted message and is attempting to flow control an upstream node), respectively. --
Line 41, renumber claim 4 as claim 8.
Line 47, renumber claim 5 as claim 4.

UNITED STATES PATENT AND TRADEMARK OFFICE
CERTIFICATE OF CORRECTION

PATENT NO. : 6,496,516 B1
DATED : December 17, 2002
INVENTOR(S) : Dabecki et al.

It is certified that error appears in the above-identified patent and that said Letters Patent is hereby corrected as shown below:

<u>Column 16,</u>
Line 1, renumber claim 6 as claim 5.
Line 6, renumber claim 7 as claim 6.
Line 11, renumber claim 8 as claim 7.

Signed and Sealed this

Third Day of June, 2003

JAMES E. ROGAN
*Director of the United States Patent and Trademark Office*